United States Patent [19]
Forrest

[11] 3,750,293
[45] Aug. 7, 1973

[54] STEREOPLOTTING METHOD AND APPARATUS

[75] Inventor: Robert B. Forrest, Union Lake, Mich.

[73] Assignee: The Bendix Corporation, Southfield, Mich.

[22] Filed: Mar. 10, 1971

[21] Appl. No.: 122,844

[52] U.S. Cl. .................................. 33/20 D
[51] Int. Cl. ................................. B43l 13/16
[58] Field of Search .................. 33/1 A, 1 M, 20 D, 33/18 C; 353/5, 6, 7; 350/136

[56] References Cited
UNITED STATES PATENTS

| | | | |
|---|---|---|---|
| 3,088,209 | 5/1963 | Schwidefsky | 33/20 D |
| 3,466,646 | 9/1969 | Lewin | 33/1 M |
| 2,303,099 | 11/1942 | Wernstedt | 33/20 D |
| 2,910,910 | 11/1959 | Rosenfeld | 33/20 D |

FOREIGN PATENTS OR APPLICATIONS
686,324  5/1964  Canada ............................. 33/20 D

Primary Examiner—Harry N. Haroian
Attorney—William F. Thornton and Plante, Hartz, Smith & Thompson

[57] ABSTRACT

A method and apparatus for obtaining three-dimensional positional or coordinate information for a scene from two stereo images of that scene. An operator views a stereoscopic image of a scene which need not be in exact proportion to that scene, but can be distorted or warped. The operator traces along and records image positions of all conjugate points or lines of interest in the overlap area of the stereo images. Calculations convert these recorded image positions to the three-dimensional coordinates the actual points had in the image scene.

40 Claims, 5 Drawing Figures

STEREOPLOTTING METHOD AND APPARATUS

BACKGROUND OF THE INVENTION

1. Field of the Invention

Stereophotogrammetry — the art of obtaining accurate three-dimensional measurement of a scene from stereoscopic observation of two-dimensional images of that scene.

2. Description of the Prior Art

Known stereoplotters include apparatus for providing a three-dimensional model of a scene, apparatus for providing a floating mark that can be moved from point to point in the model to identify and select points of interest, and apparatus for measuring the position of the floating mark to determine the model coordinate locations of the various selected points of interest. The accuracy of positional measurements of the selected points made with these known stereoplotters depends upon the ability of the stereoplotter to provide an undistorted model of the scene. In one fundamental stereoplotter the apparatus for providing a three-dimensional model of a scene includes a a flat surface on which are placed two stereo images of a scene taken from different vantage points. As used herein, the term "stereo images" is used to define any two two-dimensional representations of a three-dimensional scene taken from different vantage points, and includes photographic records, hand drawings, machine drawings, and the like. This fundamental stereoplotter also includes a binocular viewing device arranged so that an operator will view one photograph with each eye and thus see a three-dimensional image or model. A floating mark is moved from point to point in the model, and the X, Y, and Z model coordinates of the floating mark at each point are measured directly. One advantage of this simple stereoplotter is that it is extremely simple to construct and operate. The primary disadvantage is in the limited accuracy of the X, Y, and Z coordinate measurements that can be made for points in the scene. The three-dimensional model provided by this fundamental stereoplotter normally will not be exact, scale model of the photographed scene but will be a warped or distorted view of that scene. To accurately reconstruct a true stereo model of the photographed scene, the stereophotographs must be positioned so that their orientation with respect to each other corresponds to their orientation at the time of exposure. With this device, an operator can only adjust the two photographs in the plane of the surface upon which they are placed by changing their lateral separation and by rotating them. Since the photographs seldom are perfectly coplanar at the time of exposure, it is in general necessary to raise or tilt one of the photographs with respect to the other to create an unwarped stereo image. The fundamental stereoplotter does not provide such adjustments.

Other and more complicated stereoplotters overcome some of the deficiencies of the simple device described above. These devices, called projection stereoplotters, enable a physical reconstruction of the camera geometry and photographic situation. Each stereo image or photograph is placed on an independent surface that can be moved and tilted in all directions. Projection stereoplotters can accommodate a wider range of photographic situations and camera geometries than the simple device described earlier, and can more accurately reconstruct the model of the photographed scene. However, the physical reconstruction of the projection stereoplotters results in much more complexity, fragility, and cost than the simple stereo-plotter. Moreover, some factors such as differential shrinkage of the photographic film are difficult and expensive to physically reconstruct. Projection stereoplotters can incorporate only some of these additional factors, and in doing so further increase complexity and cost.

Several stereoplotters do not physically create a stereo scale model of the original scene but instead create that model mathematically. One such stereoplotter includes two independent, horizontal, movable platforms or measuring stages, each of which supports a stereo image such as a stereo-photograph; a binocular optical viewing device for providing a three-dimensional image for an operator; and a control computer. A measuring half mark is inserted in the optical path from each photograph to provide a floating mark in the three-dimensional model. Controls are provided for the operator to command apparent movement of the floating mark through a reconstructed stereo model of the photographed scene. The commands are in the form of model coordinates, regular three-dimensional coordinates which define the location of any point in an accurate, undistorted model of the photographed scene. The controls generate input signals to a high-speed computer. The computer essentially simulates the photographic situation and camera geometry mathematically, performing the geometric transformations that relate the operator command floating mark location in the stereo model to the corresponding location on each photograph at which the model location was imaged. The photo locations are defined by separate $x$, $y$, $z$ stereo image coordinate systems for each photograph. As used herein, the $z$ stereo image coordinate is the principal distance of the camera, a constant, and the $x$ stereo image coordinate lies substantially parallel to the base distance of the binocular viewing device. After calculating the two image locations, the computer controls the movement of each stage with respect to the half marks so that the calculated image location is placed directly beneath the half marks as viewed through the optics.

The above-described stereoplotter possesses a number of advantages over the conventional optical-mechanical projection stereoplotters. For example, the computer can be designed or programmed to eliminate inaccuracies caused by such factors as differential film shrinkage, lens distortion, and any other systematic physical phenomenon that can be mathematically modeled. However, this stereoplotter has a major disadvantage in that a fast and sophisticated computer is needed to permit the operator to command floating mark movements through the reconstructed model. The computer must be used continuously during plotting and must process each and every operator input signal instantaneously in order to have the floating mark appear to move through the stereo image in direct response to the operator's commands. The fact that such a computer must be an integral part of this stereoplotter, and that no plotting can be done without the immediate operation of the computer, makes the stereoplotter a complex and expensive device.

Another stereoplotter is known that creates an undistorted contour map of a scene mathematically from a model of the scene that may be distorted. This stereoplotter includes apparatus for holding and viewing two stereo images to provide a three-dimensional model for an observer. The floating mark in this stereoplotter comprises a small disc that is mounted on a mechanical motion device to be moved in the X, Y, and Z directions in space from point to point in the three-dimensional model. The stereoplotter also includes apparatus for mechanically measuring the coordinate positions of the floating mark in the three-dimensional model, and a computer connected to receive the measured X, Y, and Z model coordinates of points in the model and to calculate the coordinate positions of those points in an undistorted contour map of the scene.

This stereoplotter possesses a number of advantages in that the computer can be designed or programmed to provide an extremely accurate map or model of a photographed scene. However, it also possesses some very significant disadvantages in that a large number of mathematic transformations that relate positions in the distorted model to positions in the scene must be determined and supplied to the computer before an operator can begin plotting or selecting points of interest with this device. It is extremely difficult and time consuming to obtain these transformations. In addition, because the computer is an integral part of the stereoplotter that is adapted to continually calculate the positions of all points in the actual scene or an undistorted scale model of that scene as the floating mark is moved in the distorted model, this stereoplotter is also an expensive device.

All previous stereoplotters are based on the requirement of first reconstructing the photographed scene stereoscopically as well as possible within the design limitations of the plotter, and then extracting the dimensional information desired from the reconstruction while making floating mark movement commands in object or scaled object coordinates. Some stereoplotters do this reconstruction well, some poorly, but the intent is the same.

SUMMARY OF THE INVENTION

The subject invention comprises a method and apparatus for calculating the coordinate positions in an actual scene or in a scale model of that scene of points selected from a three-dimensional image of that scene. As used herein, the term "three-dimensional image" defines a collection of image points with each image point formed from one conjugate point on each of two stereo images. Unlike prior art systems, the three-dimensional image from which points of interest are selected need not be an accurate or undistorted representation of the actual scene. The operator can select points from a distorted image of that scene. Therefore, only a minimum amount of preliminary orientations of the two stereo images must be performed before an operator can start recording points of interest. The orientation of the two stereo images during recording need not correspond to the orientation of those images during their formation. The stereo images need only be sufficiently oriented with respect to each other during plotting to permit an operator to stereoscopically select points of interest. Also unlike the prior art systems, the image positions of conjugate point pairs on the stereo images forming points of interest in the three-dimensional image, rather than the positions of the points themselves in the coordinate system of the three-dimensional image, are recorded and used to calculate the coordinate positions of the selected points in either an undistorted model of the scene or in the scene itself.

Several stereoplotters illustrating numerous novel features of this dimension are illustrated herein. Each of the illustrated stereoplotters includes apparatus for providing a three-dimensional image or model of a scene from two stereo images of that scene. This apparatus includes image carriers for holding the two stereo images, and a binocular viewing apparatus that allows an operator to view the two stereo images simultaneously and thus see a three-dimensional image of the scene. The illustrated stereoplotters are constructed so that an operator can provide a relative movement between the binocular viewing apparatus and the two stereo images so that he can view and select points of interest from various areas of the three-dimensional image.

The two image carriers are also constructed so that they can be moved relative to each other. The character of the model viewed by an operator is unimportant because only the image positions of conjugate point pairs are used to create the undistorted model of the scene. An operator can thus move the two stereo images to provide comfortable stereo fusion in the area of the three-dimensional image in which he is selecting points of interest when he moves from one area of the three-dimensional image to another during plotting.

A novel grid structure is incorporated into each image carrier to provide a reference measuring coordinate system for measuring the coordinates of conjugate points on the stereo image. The image positions of conjugate points are first measured in the coordinate systems of the two grids. The grid coordinates of conjugate point pairs forming all points of interest can be recorded before determining the relationship between the coordinate systems of the two grids (grid coordinates), the coordinate systems of the two stereo images (stereo image coordinates), and the coordinate system of the actual scene or a scale model of that scene (model coordinates). The two stereo images are securely fastened to the two grids so that the orientation between the stereo images and the grids remains fixed while all points of interest are being selected and recorded. The relationship between the grid coordinate system and the stereo image coordinate system is determined by recording the grid coordinates of special reference marks whose stereo image coordinates are known and calculating the transformation factors required to convert the measured grid coordinate values to the known stereo image coordinate values. The relationship between the stereo image coordinate systems and the model coordinate system is similarly determined using points in the scene whose model coordinates are known. However, the calculation of the transformation between the grid coordinate systems and the stereo image coordinate systems, and between the stereo image coordinate systems and the model coordinate system, as well as the calculation of the coordinate positions in an undistorted model of the scene can be performed after the grid coordinates for conjugate point pairs forming all points of interest have been recorded. It is thus not necessary to have or use a computer while points of interest are being selected from the possibly distorted three-dimensional image used by the operator.

One stereoplotter illustrated herein includes a feedback system that allows an operator to select and record points on a contour in the actual scene even though he is selecting those points from a three-dimensional image of the scene that may be distorted. This stereoplotter includes a binocular viewing apparatus and a floating mark associated with that viewing apparatus that an operator uses to select and identify points of interest in the three-dimensional scene. In this stereoplotter, the model coordinate position of each selected point of interest is calculated immediately after the recording of the grid coordinates of the conjugate point pair forming that selected point. Calculated grid coordinate adjustments are supplied to a feedback control system constructed to move out of the stereo images and thereby introduce observable X parallax into the three-dimensional image viewed by the operator when the calculated elevation of a point differs from the elevation of a preselected contour of the scene. The operator provides a relative movement between the stereo images and the viewing apparatus to eliminate this X parallax and thereby causes the floating mark to be moved toward a point whose calculated elevation in the model coordinate system will be on the preselected contour.

Novel half marks are also illustrated herein that can be used with either of the two illustrated stereoplotters. These half marks permit an operator to record the x and y coordinates of conjugate points from one stereo image and only the x coordinates of conjugate points on the other stereo image, and to use these three coordinate values of conjugate points to calculate the coordinate positions of selected points in an undistorted model of the scene. These novel half marks are shown inserted into each optical path of the binocular viewing apparatus of one stereoplotter to provide a floating mark for selecting and identifying points of interest in the three-dimensional image. The two half marks are superimposed on each other when placed over conjugate image points and viewed by an operator. The half marks provide a floating mark having both x coordinate and y coordinate defining portions so that an operator can select and identify points of interest in the three-dimensional image. However, because one half mark provides only an x defining portion of the floating mark, the floating mark will not appear to separate into two distinct marks when the half marks are placed over conjugate points of the two stereo images and when the two stereo images are so oriented with respect to each other that there is a small amount of Y parallax in the three-dimensional image viewed by the operator. This half mark design thus minimizes the adjustment necessary when recording points of interest in different areas of a distorted three-dimensional image. That is, an operator need not readjust the stereo images to remove small amounts of Y parallax from the portion of the three-dimensional image that he is viewing.

BRIEF DESCRIPTION OF THE DRAWINGS

Further objects, features and advantages of this invention, which are defined by the appended claims, will become apparent upon a consideration of the following description and accompanying drawings in which:

FIG. 5 is a schematic view of another embodiment of the stereo-plotter apparatus of this invention constructed to provide a signal for an operator that notifies him that he is recording points displaced from a preselected contour in the three-dimensional scene represented by the stereo images.

DETAILED DESCRIPTION OF THE DRAWINGS

Figure 1:
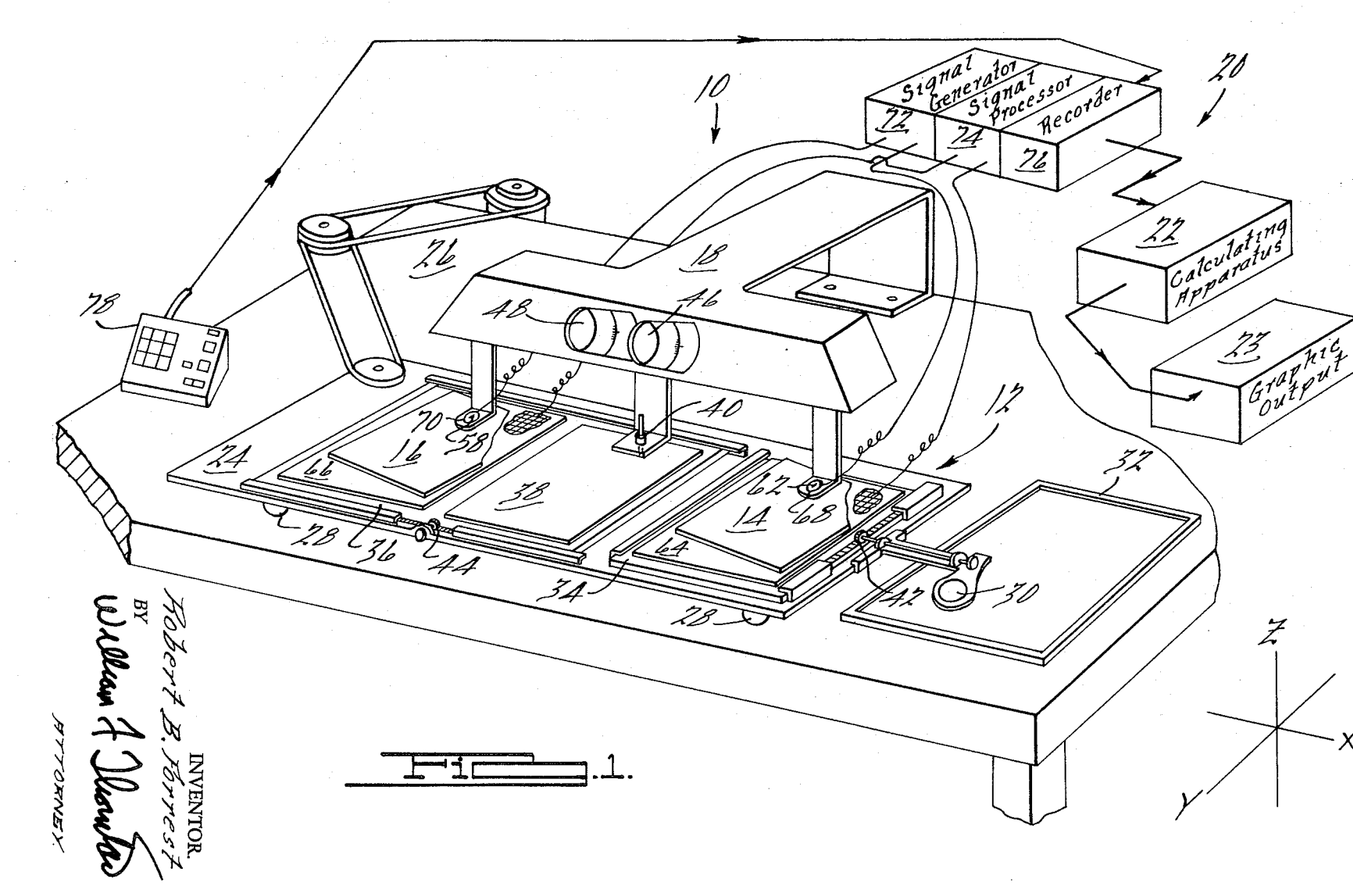
FIG. 1 is a schematic diagram of an embodiment of the stereo-plotter apparatus of this invention.

FIG. 1 illustrates a stereoplotter 10 including apparatus 12 for holding two stereo images 14 and 16 which are photographs of a scene, and binocular viewing apparatus 18 for viewing those photographs and providing a three-dimensional image of the scene. The three-dimensional image comprises a collection of image points, with each image point formed from one conjugate point on each of the stereophotograph 14 and 16. The stereoplotter 10 also includes apparatus 20 for providing a record of the grid coordinates of conjugate points on the stereophotographs 14 and 16 forming points in the three-dimensional image selected to be of interest by an operator. The apparatus 20 supplies the recorded grid image coordinates to calculating apparatus 22 which is adapted to use the recorded coordinates to calculate first the stereo image coordinates of the conjugate point pairs, and from these the coordinate position in an undistorted model of the scene of each three-dimensional image point represented by a recorded pair of conjugate points. The calculated model coordinate positions provided by calculating apparatus 22 are supplied to a graphic output device 23 which provides a two-dimensional graphic representation of the undistorted scene.

The apparatus 12 for holding the two stereophotographs 14 and 16 includes a first surface or platform 24, movably mounted on table 26 by casters 28. Platform 24 is mounted so that it can be moved relative to the viewing apparatus 18 so that an operator can view and record points of interest in various portions of the three-dimensional image provided by the two stereo images 14 and 16. Platform 24 is held by a parallel motion arm 26 that forces platform 24 to remain parallel with the X axis of the stereo-plotter 10 during any platform movement. This prevents an operator from inadvertently moving the platform 24 in a manner that would cause Y parallax to be introduced into the three-dimensional image provided by the stereophotographs 14 and 16. The platform 24 is connected to a captive ball 30 which an operator moves to move the two stereophotographs 14 and 16 with respect to the viewing apparatus 18. A frame 32 surrounds the captive ball 30 and acts as a guide that prevents the operator from moving the platform 24 so far in one direction that the stereo images 14 and 16 will no longer be aligned with the viewing apparatus 18.

Two platforms 34 and 36 are movably mounted on the first platform 24. Platform 34 holds the stereophotograph 14 while platform 36 holds stereophotograph 16, and a sheet of drawing paper 38. A rectractably mounted pencil 40 forms a trace on drawing paper 38 of the relative movement of the stereophotograph 16 with respect to the viewing apparatus 18. This trace prevents an operator from inadvertently viewing and recording the coordinates of one point, line, or area of interest more than once. A rack and pinion 42 is provided to move platform 34 and stereophotograph 14 along the Y axis of stereoplotter 10, and a second rack and pinion 44 is provided to move platform 36 and stereophotograph 16 along the X axis of stereoplotter 10. An operator moves the two stereophotographs with these two racks and pinions to so orient them relative to one another that they provide a three-dimensional image that can be comfortably viewed and from which he can select points of interest to be recorded.

The operator sees a three-dimensional image by viewing the two stereophotographs 14 and 16 through two eyepieces 46 and 48 of the viewing apparatus 18. These two eyepieces determine the eye base and the orientation of the X, Y, and Z axes of the stereoplotter 10. The eye base of the stereoplotter 10 is a line connecting the centers of the two eyepieces 46 and 48. The X axis of the stereoplotter is parallel to this eye base. The Y axis of the stereoplotter is perpendicular to the X axis and is substantially in the plane of the stereo images 14 and 16. The Z axis of the stereoplotter defines elevation in the three-dimensional image viewed by an operator and is perpendicular to both the X and Y axes, and is also substantially normal to the plane of the stereo images 14 and 16.

Figure 2:
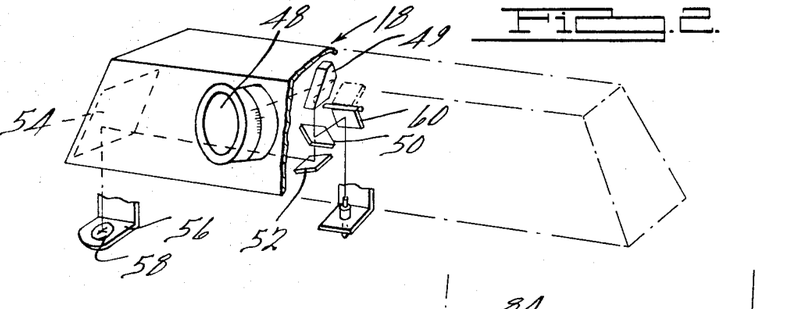
FIG. 2 is a cutaway schematic view of the binocular viewing apparatus of the stereoplotter shown in FIG. 1.

A detailed view of one path of a binocular viewing apparatus 18 is provided by the cutaway view of FIG. 2. The path between eyepiece 48 and stereophotograph 16 includes a prism 49 referred to by those skilled in the art as a Frankfort Arsenal Prism No. 4, a glass surface 50, mirrors 52 and 54, and a glass surface 56 having a half mark 58 etched thereon. The half mark 58 is placed over stereo image 16. A second half mark 62 (FIG.) 1) is placed over stereo image 14. These two half marks form a floating mark in the three-dimensional image viewed by the operator when they are placed over conjugate points on the two stereophotographs. The floating mark formed by these two half marks appears to move in the three-dimensional image viewed by an operator as the platform 24 is moved relative to the viewing apparatus 18. An operator selects points of interest in the three-dimensional image stereoscopically by moving the platform 24 to place the floating mark over those points.

The viewing apparatus 10 also includes a mirror 60 which an operator can position to superimpose an image of the trace pattern on sheet 38 onto the image of the scene provided by stereo image 16. He can thus view the trace pattern of the previous relative movement of the viewing apparatus 18 and stereophotographs 14 and 16 as he views the three-dimensional image provided by those stereophotographs.

The grid coordinates of conjugate points forming points of interest in the three-dimensional image viewed by an operator are provided by the apparatus 20 which is constructed to provide a record of the positions of the two half marks 58 and 62. Any number of devices are known that could be used to determine the positions of these two half marks. However, the particular apparatus shown comprises the coordinate determining apparatus described in the U.S. Pat. Application Ser. No. 805,559, "Automatic Coordinate Determining Device", K. V. Bailey; assigned to The Bendix Corporation. This apparatus includes two conductive grid structures 64 and 66 that are fixedly attached to photographs 14 and 16, respectively, and two conductive cursors 68 and 70 which surround the half marks 62 and 58, respectively. The center of each half mark is located at the center of the cursor surrounding it. Signal generating apparatus 72 transmits signals to the two cursors 68 and 70 which cause signals to be induced in the conductive grid structures 64 and 66. These induced signals change in response to relative movement between grid structures 64 and 66, and the cursors 68 and 70. The induced signals are transmitted to signal processing apparatus 74 which is constructed to be responsive to changes in the induced signals to determine the positions of the centers of cursors 68 and 70 with respect to preselected reference points on grid structures 64 and 66, respectively. The signal processing apparatus 74 transmits signals indicating the positions of cursors 68 and 70 to recorder 76. Since the half marks 58 and 62 are located at the centers of cursors 70 and 68, respectively, these signals represent the positions of the two half marks. Recorder 76 forms a record of the grid coordinates of the conjugate points forming points, lines, and areas in the three-dimensional image selected to be of interest by an operator. Signals from recorder 76 are transmitted to calculating apparatus 22 which is adapted to calculate the coordinate positions in an undistorted model of the scene of each point represented by a recorded pair of conjugate points. The information provided by calculating apparatus 22 is supplied to a plotting device 23 which provides an undistorted map or graph of the scene. The nature of the calculations performed by apparatus 22 and the type of output provided by that apparatus are determined by control or command signals that an operator inserts into the record provided by recorder 76 with a control device 78. Signals from the control device 78 indicate the classification of the various recorded signals. These signals thus distinguish one class of recorded points such as fiducial marks from a second class of recorded points such as contour levels, from a third class such as a particular topographic feature.

Although calculating apparatus 22 is shown as connected to the recorder 76 in FIG. 1, it is understood that it need not be physically connected to that apparatus during the time that an operator is viewing the two stereo images 14 and 16 and recording the grid coordinates of conjugate points of interest. A record of the grid coordinates of all such conjugate points can be formed before any calculations need be performed.

In operation, two stereophotographs 14 and 16 are first placed on and fastened to the grid structures 64 and 66, respectively. These photographs are then moved together with their respective grid structures either by hand or by use of the rack and pinion structures 42 and 44 so that they will be oriented with respect to the binocular viewing apparatus 18 to provide a three-dimensional image that can be comfortably viewed by an operator, and from which he can select points of interest to be recorded. A record of the grid coordinates of conjugate points of interest on the two photographs 14 and 16 is provided by the apparatus 20. As described above, the signal processing apparatus 74 provides signals indicating the positions of the cursors 62 and 58 with respect to the grid structures 64 and 66, respectively. Points on the photographs 14 and 16 will generally not have the same ($x$ and $y$) coordinate values in both the stereo image coordinate systems and the grid coordinate systems because the photographs will generally be rotated and translated with respect to the grid structures. A transformation between the two systems is made for a photograph by using the half mark to record the grid coordinates of several fiducial marks or special reference marks at the edges of the photographs. The image coordinates of the fiducial marks are predetermined camera constants for the photographs, and are thus known. An operator transmits a signal from control device 78 to recorder 76 when the floating mark is on a fiducial mark that indicates that the coordinates are those of a fiducial mark and can be used to determine the relationship between the grid and stereo image coordinate systems. The transformation between the two coordinate systems is determined by the following equations:

$$x = x_g \cos\theta + y_g \sin\theta + x_o$$
$$y = -x_g \sin\theta + y_g \cos\theta + y_o$$

(1)

where:

$x, y$ = stereo image coordinates of a point $x_g, y_g$ = grid coordinates of the same point $x_o, y_o$ = stereo image coordinates of the grid-coordinate origin $\theta$ = angle of rotation between the grid and stereo image coordinate systems All mathematic symbols defined herein will be used consistently throughout and will not be redefined. By inserting the known stereo image coordinates and the measured grid coordinates for two or more fiducial marks into equations (1), two or more sets of equations are formed which when solved determine the three unknown parameters $\theta$, $x_o$, and $y_o$. Separate grid-to-stereo image coordinate transformations are obtained for each stereo image. After the transformations have been determined by the calculating apparatus 22, the grid coordinates of conjugate image points are converted to stereo image coordinates, using equations (1). The stereophotographs 14 and 16 are firmly attached to the grid structures 64 and 66, respectively, so that the transformation factors $\theta$, $x_o$, and $y_o$ need be calculated only one time for each photograph.

An operator then views the three-dimensional image provided by the two photographs 14 and 16 and provides a record of the grid coordinates of conjugate points forming points of interest in the three-dimensional image. The signal processing apparatus 74 continually provides signals indicating the positions of half marks 62 and 58. When the operator sees the floating mark on a point of interest he transmits a control signal from the control device 78 to the recording apparatus 76 which directs that a record be formed of the grid coordinates of the conjugate points forming that point of interest. If this point of interest is at the beginning of a pattern that the operator wishes to trace, such as at the beginning of a road, river, profile, or contour level, he may also transmit a signal from the control device 78 to recorder 76 directing the grid coordinates of all subsequent positions of the half marks 62 and 58 also be recorded, until the operator transmits a termination signal from the control device 78. The operator may also supply a control signal from control device 78 indicating the type of landmark being followed. This signal is useful for constructing a map or graph of the scene.

The recorded sets of grid coordinates for the half marks 62 and 58 are transmitted to the calculating apparatus 22. This calculating apparatus is adapted to use these recorded grid coordinates to calculate the stereo image coordinates, and then the position in an undistorted model of the scene of each image point represented by a recorded pair of conjugate points. The stereo image coordinates of conjugate points in the stereophotographs differ from the coordinates in an undistorted model of the scene of the points represented by a conjugate point pair for several reasons. First, height or elevation of an object in a photograph appears as an $x,y$ displacement on that photograph. Second, the image or stereophotograph may be at a different scale from the model. And third, the origin of the stereo image coordinate system for each photograph may be displaced from the coordinate origin of the model. That is, if the camera was tilted or rotated slightly when either photograph was taken, the stereo image coordinate system for that photograph will be similarly tilted or rotated with respect to the coordinate system of the undistorted model.

The transformation between stereo image and model coordinates is based on the recorded grid coordinates of various control point images on the stereophotograph. Control points are photo-identifiable locations in a photographed scene whose X, Y, and Z coordinates in that scene or in an undistorted model of that scene are known. The operator records the grid coordinates of the control points on each photograph by pointing stereoscopically with the floating mark to the control point images and by transmitting control signals from control device 78 to recorder 76 which indicate that the half marks are placed over control points on the two photographs and identify the control point by number. The grid coordinates of the conjugate points forming the control point image are then recorded and transformed to the image coordinates of those points according to equations (1). Image coordinates of a point are transformed to the model coordinates or the coordinate position of that point in an undistorted model using the following equations:

$$X = X_{L_{16}} + Sx'_{16}$$
$$Y = Y_{L_{16}} + Sy'_{16}$$

2

$$Z = Z_{L_{16}} + Sz'_{16}$$

where:

$X, Y, Z$ = Model coordinates of a point in the photographed scene, also referred to herein as the coordinates of a point in an undistorted model of the scene $X_{L_{16}}, Y_{L_{16}}, Z_{L_{16}}$ = The location in model coordinates of the coordinate origin of the image coordinate system for stereophotograph 16

$S$ = A scale factor enlarging or reducing image coordinate scale to model coordinate scale; $S$ can be defined by the expression:

$$S = \frac{(X_{L_{14}} - X_{L_{16}})z'_{14} - (Z_{L_{14}} - Z_{L_{16}})x'_{14}}{x'_{16} z'_{14} - x'_{14} z'_{16}}$$

$x'_{16}, y'_{16}, z'_{16}$ = The stereo image coordinates of photograph 16 rotated to be parallel to the model coordinate axes by the mathematic expressions:
$x'_{16} = (a_{11})x_{16} + (a_{21})y_{16} + (a_{31})c_{16}$
$y'_{16} = (a_{12})x_{16} + (a_{22})y_{16} + (a_{32})c_{16}$
$z'_{16} = (a_{13})x_{16} + (a_{23})y_{16} + (a_{33})c_{16}$
in which:
$x'_{14} = (b_{11})x_{14} + (b_{21})y_{14} + (b_{31})c_{14}$
$z'_{14} = (b_{13})x_{14} + (b_{23})y_{14} + (b_{33})c_{14}$
$X_{L_{14}}, Z_{L_{14}}$ = The $X$ and $Z$ model coordinates of the image-coordinate origin for stereophotograph 14
$x_{14}, y_{14}$ = Stereo image coordinates of the model point $(X,Y,Z)$ as imaged on stereophotograph 14
$x_{16}, y_{16}$ = Stereo image coordinates of the model point $(X,Y,Z)$ as imaged on stereophotograph 16
$c_{16}$ and $c_{14}$ = Known camera constants comprising the perpendicular distances from the perspective centers of the camera lenses to the film planes for the cameras that exposed stereophotographs 16 and 14, respectively
$(a_{ij})$ = Well-known direction cosines of $\Omega_{16}, \phi_{16}, _{16}$ which indicate the sequential rotations between the $x, y,$ and $z$ axes of the image coordinate system of stereophotograph 16 and the $X, Y,$ and $Z$ axes of the model coordinate system.

The $(a_{ij})$ terms can be expressed in one form as:
$(a_{11}) = \cos \phi_{16} \cos _{16} - \sin \phi_{16} \sin \Omega_{16} \sin _{16}$
$(a_{12}) = \cos \phi_{16} \sin _{16} + \sin \phi_{16} \sin \Omega_{16} \cos _{16}$
$(a_{13}) = -\sin \phi_{16} \cos \Omega_{16}$
$(a_{21}) = -\cos \Omega_{16} \sin _{16}$
$(a_{22}) = \cos \Omega_{16} \cos _{16}$
$(a_{23}) = \sin \Omega_{16}$
$(a_{31}) = \sin \phi_{16} \cos _{16} + \cos \phi_{16} \sin \Omega_{16} \sin _{16}$
$(a_{32}) = \sin \phi_{16} \sin _{16} - \cos \phi_{16} \sin \Omega_{16} \cos _{16}$
$(a_{33}) = \cos \phi_{16} \cos \Omega_{16}$
$(b_{ij})$ = Well-known direction cosines of $\Omega_{14}, \phi_{14}, _{14}$ which indicate the sequential rotations between the $x, y,$ and $z$ axes of the image coordinate system of stereophotograph 14 and the $X, Y,$ and $Z$ axes of the model coordinate system.

The $(b_{ij})$ terms can be expressed in one form as:
$(b_{11}) = \cos \phi_{14} \cos _{14} - \sin \phi_{14} \sin \Omega_{14} \sin _{14}$
$(b_{12}) = \cos \phi_{14} \sin _{14} + \sin \phi_{14} \sin \Omega_{14} \cos _{14}$
$(b_{13}) = -\sin \phi_{14} \cos \Omega_{14}$
$(b_{21}) = -\cos \Omega_{14} \sin _{14}$
$(b_{22}) = \cos \Omega_{14} \cos _{14}$
$(b_{23}) = \sin \Omega_{14}$
$(b_{31}) = \sin \phi_{14} \cos _{14} + \cos \phi_{14} \sin \Omega_{14} \sin _{14}$
$(b_{32}) = \sin \phi_{14} \sin _{14} - \cos \phi_{14} \sin \Omega_{14} \cos _{14}$
$(b_{33}) = \cos \phi_{14} \cos \Omega_{14}$ The transformation between stereo image and model coordinates is determined by inserting the measured stereo image coordinates and the known model coordinates of three or more control points into the above equations and solving for the lateral transformation elements $X_{L_{16}}, Y_{L_{16}}, Z_{L_{16}}$ and $X_{L_{14}}, Z_{L_{14}}$ and for the angular transformation elements $\Omega_{16}, \phi_{16}, _{16}, \Omega_{14}, \phi_{14}$, and $\kappa_{14}$. Once these transformation elements have been determined, equations (2) can be used to calculate the position in an undistorted model of the scene, of each point represented by a recorded pair of conjugate points.

Since the positions in an undistorted model of the scene of points selected to be of interest by an operator are calculated in a calculating operation that can be entirely independent from the selection of points from the three-dimensional image, the stereoplotter 10 can be used to provide a contour map without requiring the operator to follow a contour in the three-dimensional image in order to provide that map. Indeed, the two stereophotographs 14 and 16 can provide a three-dimensional image that is so warped with respect to the actual scene that an operator cannot follow even as approximation of a contour line in the actual scene. An operator may follow a predetermined pattern and record points at regular intervals in areas of surface relief and obtain a contour map by allowing calculating apparatus 22 to determine which of the recorded points lie along predetermined contours in the undistorted model of the scene. For example, an operator can move the platform 24 in a manner that moves the floating mark along a plurality of parallel lines, and he can record the grid coordinates of either critical elevation points on these lines or of points spaced at preselected fixed intervals on these lines.

Figure 3:
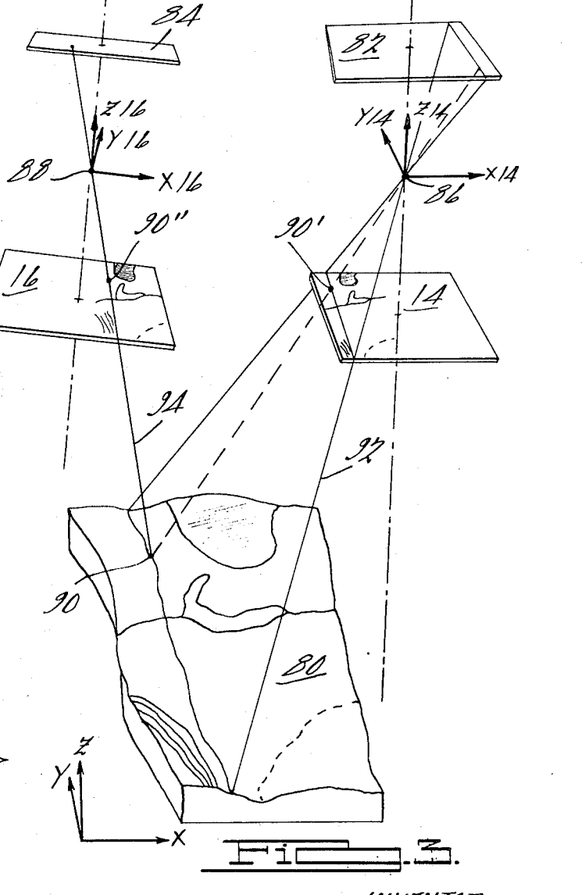
FIG. 3 is a perspective view of two images of a land area taken from different vantage points which illustrate that the coordinates of a point on the land area can be determined from the x and y stereo image coordinates of that point on one image and the x stereo image coordinate of that point on the other image.

FIG. 3 illustrates that it is not necessary to use both the $x$ and $y$ stereo image coordinates of conjugate points on each stereophotograph in order to calculate the position in an undistorted model of the scene represented by a recorded pair of conjugate points. That is, the position of a point in an undistorted model of the scene can be determined if the $x$ and $y$ stereo image coordinates of a conjugate point on one photograph are known and the $x$ stereo image coordinate of the conjugate point on the other photograph is known. FIG. 3 includes the two stereophotographs 14 and 16 and the scene or land mass 80 represented by those photographs. The stereo images 14 and 16 are produced from two negative images 82 and 84, which in turn are provided by two cameras (not shown) located in the positions defined by stereo image coordinate systems 86 and 88. The coordinate origin of coordinate system 86 defines the position of the camera lens during formation of negative 82, and the coordinate origin of coordinate system 88 defines the position of the camera lens during formation of negative image 84. Any positive photographic image such as either photographic image 14 or 16 comprises the projection of a negative image such as image 82 or 84 through the camera lens as is shown in FIG. 3.

As FIG. 3 illustrates, if the camera constants, such as the perpendicular distance from the camera lens to the plane of the film in the camera, and the orientations of the cameras at the time of exposure are known or can be calculated, the position of any point such as point 90 on land mass 80 can be determined from the $x$ stereo image coordinate of point 90' and the $x$ and $y$ coordinates of the point 90''. The points 90' and 90'' are the imaged representations of point 90 on the photographs 14 and 16, respectively. The position, that is the $X, Y,$ and $Z$ coordinates, of point 90 in the land mass is unique determined by the intersection of plane 92 and object-image ray 94. On the $x$ stereo image coordinate of point 90' on stereophotograph 14 need be known to form plane 92. That is, this plane extends from the origin of stereo image coordinate system 86 through all points on stereophotograph 14 having an $x$ stereo image coordinate value equal to the $x$ stereo image coordinate value of point 90'. The object-image ray 94 extends from the coordinate origin of stereo image coordinate system 88 through point 90'' on stereophotograph 16. The $x$ and $y$ stereo image coordinates of that point, therefore, uniquely define this ray.

The stereoplotter 10 shown in FIG. 1 can, therefore, be modified to determine the coordinate positions in an undistorted model of a scene of points selected to be of interest by an operator using only the $x$ stereo image coordinates of conjugate points of interest on one stereo image, and the $x$ and $y$ stereo image coordinates of conjugate points on the other stereo image. The recorder 76 is adapted to provide the $x$ and $y$ grid coordinates of conjugate points on one stereo image and the $x$ grid coordinates of conjugate points on the other stereo image using the signals provided by the processing apparatus 74 indicating the positions of cursors 58 and 62 with respect to the grid structures 66 and 64. These grid coordinate values may then be converted to stereo image coordinates by calculating apparatus 22 using equations (1) in a manner similar to that described above. If stereophotograph 14 is positioned with respect to grid 64 such that the $x_{14}$ and $y_{14}$ stereo image coordinates differ from $x_g$ and $y_g$ grid coordinates only by translations $x_o$ and $y_o$, equations (1) for stereo image 14 are simply $x_{14} = x_g + x_o$, and the $y_g$ grid coordinate is not recorded. Alternatively, the x grid coordinates of grid 64 may be used in lieu of the true $x$ stereo image coordinates regardless of the orientation of stereophotograph 14 with respect to grid 64. In this latter case, the $x$ grid coordinate must be translated to the stereo image coordinate by the quantity $x_o$. In either event, the $X$, $Y$, and $Z$ coordinate positions in an undistorted model of a scene are determined from the three stereo image coordinates $x_{16}$, $y_{16}$, and $x_{14}$ using the following equations:

$$X = X_{L_{16}} + S' x'_{16}$$
$$Y = Y_{L_{16}} + S' y'_{16}$$
$$Z = Z_{L_{16}} + S' z'_{16}$$

where:

$$S' = \frac{\Delta X'_L c_{14} - \Delta Z'_L x_{14}}{x''_{16} c_{14} - z''_{16} x_{14}}$$

in which:

$$\Delta X'_L = b_{11}(X_{L_{14}} - X_{L_{16}}) + b_{12}(Y_{L_{14}} - Y_{L_{16}}) + b_{13}(Z_{L_{14}} - Z_{L_{16}})$$
$$\Delta Z'_L = b_{31}(X_{L_{14}} - X_{L_{16}}) + b_{32}(Y_{L_{14}} - Y_{L_{16}}) + b_{33}(Z_{L_{14}} - Z_{L_{16}})$$

$x''_{16} = d_{11} x_{16} + d_{12} y_{16} + d_{13} c_{16}$
$z''_{16} = d_{31} x_{16} + d_{32} y_{16} + d_{33} c_{16}$
$(d_{ij})$ = Direction cosines of $\Omega'$, $\phi'$, and ' indicating the sequential rotation of the $x$, $y$, and $z$ image coordinate axes of stereophotograph 16 required to place them parallel to the $x$, $y$, and $z$ image coordinate axes of stereophotograph 14. The angles $\Omega'$, $\phi'$, and ' are simply the differences $\Omega_{14} - \Omega_{16}$, $\phi_{14} - \phi_{16}$, and $\kappa_{14} - \kappa_{16}$, respectively. These direction cosines can be expressed in one form as:
$(d_{11})$ = cos $\phi'$ cos ' − sin $\phi'$ sin $\Omega'$ sin '
$(d_{12})$ = cos $\phi'$ sin ' 30 sin $\phi'$ sin $\Omega'$ cos '
$(d_{13})$ = −sin $\phi'$ cos $\Omega'$
$(d_{31})$ = sin $\phi'$ cos ' + cos $\phi'$ sin $\Omega'$ sin '
$(d_{32})$ = sin $\phi'$ sin ' − cos $\phi'$ sin $\Omega'$ cos '
$(d_{33})$ = cos $\phi'$ cos $\Omega'$ The relationship between the image coordinate system for each photograph and the coordinate system of the undistorted model is determined using equations (3) in a manner similar to that described above using equation (2). That is, the stereo image and model coordinates of control points are inserted into equations (3) which then are solved for the elements of those equations which indicate the lateral and rotational transformations between the image and object coordinate systems. That is, equations (3) are solved for the angular transformation elements $\Omega_{16}$, $\phi_{16}$, $\Omega'$, and $\kappa'$ and the lateral transformation elements $X_{L_{16}}$, $Y_{L_{16}}$, $Z_{L_{16}}$, $(X_{L_{14}} - X_{L_{16}})$, and $(Z_{L_{14}} - Z_{L_{16}})$. Once these transformation elements are known, equations (3) are used to convert the stereo image coordinates of all selected points to the model coordinates of those points.

Figure 4:
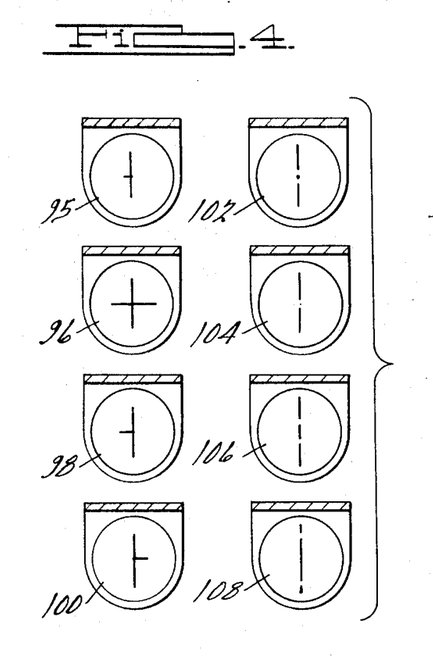
FIG. 4 illustrates several combinations of half marks designed for obtaining x and y coordinate information from one stereo image and x coordinate information from the other.

Since the $x$ and $y$ stereo image coordinates of conjugate points on one stereophotograph and only the $x$ stereo image coordinates of conjugate points on the other stereophotograph are used to determine the positions of points in an undistorted model of the scene, the two half marks can be designed so that it will be unnecessary to continually adjust the stereophotographs to remove Y parallax from the three-dimensional image viewed by the observer. That is, the two half marks 58 and 62 need not be identical. Several designs for these half marks are shown in FIG. 4. The two half marks must be designed to form a floating mark that an operator can use to stereoscopically select points of interest. That is, the floating mark must define a unique $x$ and $y$ position in the three-dimensional image. However, each half mark need not provide both an $x$ coordinate and $y$ coordinate defining portion of the floating mark because only the $x$ coordinates of points on one stereophotograph will be recorded. FIG. 4 illustrates four half marks 95, 96, 98, and 100, that will provide both an $x$ and a $y$ defining portion of the floating mark, and four half marks 102, 104, 106, and 108 that provide only an $x$ coordinate defining portion of that floating mark. Any one of the marks 95 through 100 can be used with any one of the marks 102 through 108 to provide a floating mark that an operator can use to identify and select points in a three-dimensional image. One of the marks 95 through 100 would be placed over the stereophotograph from which it is desired to record both the $x$ and $y$ grid coordinates of conjugate points of interest, and one of the half marks, 102 through 108 would be placed over the stereophotograph from which it is desired to record only the $x$ grid coordinates of conjugate points of interest. An operator will see the two marks superimposed on each other so that they will appear to fuse together to form a floating mark. The half marks will not appear to separate when placed over conjugate points on stereo images oriented to provide a three-dimensional image having Y parallax. The cross pattern of the half mark selected from marks 95 through 100 will merely appear to move along the line comprising the half mark selected from marks 102 through 108 in response to the introduction of Y parallax into the three-dimensional image. Half marks 104 through 108 do provide a y-reference for an operator, should he desire to record a y coordinate. This y-reference is present as one or more breaks in the lines. The breaks provide y coordinate information when those lines are viewed by one eye alone.

The advantage of this design is due to the physiology of human viewing. If two conjugate images viewed through the optics of the device are slightly separated in the Y direction, the eyes can accommodate adequately and so maintain stereo fusion. If conventional half mark dots are used, when their Y separation is different from that of the conjugate image areas, they are not over conjugate points, and the operator notes Y parallax. Hence, this Y accommodation capability does not help him; he still must turn the Y-adjustment apparatus 42 to remove the Y parallax he sees in the marks. With the new mark design, the floating mark is not defined in the Y direction, hence the operator sees no Y parallax under such condition of photograph displacement in the Y direction. Instead, the X-segment of the cross appears to lie perpendicular to the floating line at some point other than the center of the floating line. The operator need only translate the entire reference surface in Y to point to an image with the mark. Thus, differential adjustment of the half marks in the Y direction to remove Y parallax need be made much less frequently than when using conventional half mark patterns, only when the Y parallax becomes too great for strain-free Y accommodation of the eyes or when the X-segment of the cross moves beyond the end of the floating line.

FIG. 5 illustrates a stereoplotter 110 that is constructed to allow an operator to select points from the model that lie along a contour in the actual scene. The stereoplotter 110 includes a feedback circuit comprising a control 114 and motor 116 for moving rack and pinion 44 and a feedback signal generator 117 that indicates the amount of movement provided by motor 116. This feedback circuit receives the calculated coordinates of positions provided by calculating apparatus 22 and provides a signal to an operator which indicates whether or not he is selecting points that lie along a preselected contour in the undistorted model. The operator is able to select points along this contour even though he is not provided with an unwarped image of that scene. Therefore, in order to provide this signal which indicates whether or not the operator is following a preselected contour, the relationship between grid coordinates, stereo image coordinates, and the coordinate system of the undistorted model is determined before plotting is begun by placing the half marks 58 and 62 over fiducial marks and control points on the two stereo images and calculating the relationships between the several coordinate systems in the manner described above. The calculating apparatus 22 is then adapted to calculate the position in an undistorted model of a scene of each point represented by a recorded pair of conjugate points immediately after the recording of the grid coordinates of the conjugate point pair.

These calculated positions are transmitted to the control device 114 which causes X parallax to be introduced into the three-dimensional image viewed by the operator when the calculated elevation of a point differs from the elevation of a preselected contour.

In order to obtain this introduction of X parallax from the three-dimensional image, control apparatus 114 is adapted to determine the difference between the calculated elevation of a point and a contour elevation previously entered by the operator by control signals from control device 78. Control apparatus 114 causes stereophotograph 16 to be moved in a direction determined by the direction of the elevation error. If the calculated elevation of a point is lower than the preselected contour elevation, the stereophotograph 16 is moved away from stereophotograph 14. Similarly, if the calculated elevation of a point is higher than the preselected contour elevation, stereophotograph 16 is moved toward stereophotograph 14. The amount of movement of stereophotograph 16 in each case is proportional to the elevation error between the point and the preselected contour elevation. The movement of stereophotograph 16 is provided by motor 116 which drives rack and pinion 44 to move carrier 36 and thus the stereophotograph 16 and grid 66 placed thereon. Generator 117 generates feedback signals for control 114 to indicate the amount of movement provided by motor 116. Control 114 will continue to cause stereophotograph 16 to be moved until that control receives sufficient signals from signal generator 117 indicating that the stereophotograph has been moved a distance appropriate with the magnitude of the elevation error.

The presence of a slight X parallax in the three-dimensional image viewed by the operator is seen as the floating mark appears to float above or burrow beneath the surface of the three-dimensional image. This condition indicates to him that he is selecting and recording points from the three-dimensional image that are slightly displaced from the preselected contour in the undistorted model of the scene, and that he must correct this condition by adjusting the platform 24 with the captive ball 30 to make the floating mark appear to resume contact with the surface of the three-dimensional image. By providing error indicating signals to control apparatus 114 at sufficiently frequent intervals, calculating apparatus 22 insures that the elevation errors are always kept within acceptably small limits. Thus, since the calculated positions are also transmitted to the graphical output device 23, stereoplotter 110 provides an undistorted contour map of a scene without requiring that the two stereo images be so oriented to provide an undistorted three-dimensional image of a scene before an operator can begin recording coordinates.

It is also understood that the control device 114 could provide the elevation signal in a different manner, by lighting one of two display lamps to indicate a plus or minus elevation error, the direction of each error being indicated by a different colored lamp. In this case the motor apparatus 116 is not used. The lamps are located on the equipment so the light is visible to the operator as he observes the three-dimensional model through the binocular viewing apparatus. He adjusts the X parallax or floating mark location manually, so as to keep the floating mark in contact with the perceived surface of the three-dimensional image at a location where neither error lamp is lit.

Having thus described several embodiments of this invention, a number of modifications will be immediately obvious to those skilled in the art. Therefore, What is claimed is:

1. A stereoplotter for providing an undistorted model of a scene from two stereo images of the scene, each stereo image including reference points representing predetermined locations in the scene comprising:
   means for holding the two stereo images of the scene in positions that provide one viewing the two stereo images with a three-dimensional image that may be either distorted or undistorted, said three-dimensional image comprising a collection of image points, with each image point formed from one conjugate point on each of the two stereo images;

viewing means for viewing various points, lines, and areas of said three-dimensional image;

means for selecting individual points and series of points defining lines and areas of interest in said three-dimensional image;

means for automatically measuring the image positions of conjugate point pairs forming said selected image points, lines and areas in said three-dimensional image;

calculating means for using said measured image positions and the relationship between the positions of said reference points on the stereo images and the predetermined locations in the scene to calculate the coordinate positions in an undistorted model of said scene of image points, lines and areas represented by said selected pair of conjugate points; and output means responsive to said calculated coordinate positions for providing a representation of the undistorted scene.

2. The stereoplotter set forth in claim 1 in which:

the stereoplotter further includes means for recording said measured image positions; and said calculating means comprises means for calculating said coordinate positions in said undistorted model for each selected point after all points of interest have been selected and recorded.

3. The stereoplotter set forth in claim 1 in which said calculating means comprises means for responding immediately to said measured image positions and provide a real time representation of the coordinate position of each selected image point, line, and area in an undistorted model of the scene.

4. The stereoplotter set forth in claim 1 further including:

means for recording said measured image positions; and a control device for inserting control signals into the record of said image positions to indicate the classification of said recorded point pairs.

5. The stereoplotter set forth in claim 1 in which:

said means for selecting points, lines, and areas of interest comprises means for providing a floating mark to stereoscopically identify and select points, lines and areas of interest in said three-dimensional image; and the stereoplotter further includes means for automatically recording the image positions of conjugate point pairs forming an image point identified by the floating mark whenever said floating mark is moved a predetermined distance.

6. The stereoplotter set forth in claim 1 further including means for forming a trace of points, lines, and areas selected to be of interest to enable an operator to determine the points, lines, and areas of interest that have been selected.

7. The stereoplotter set forth in claim 6 in which:

said viewing means is constructed to superimpose an image of said trace onto said three-dimensional image.

8. In a stereoplotter for providing an undistorted model of a scene from two stereo images of the scene carrying reference points representing predetermined locations in the scene and having:

means for holding the two stereo images; and viewing means for viewing the two stereo images to provide a possibly distorted three-dimensional image of said scene, said three-dimensional image comprising a collection of image points, each image point formed from one conjugate point on each of the two stereo images; and means for selecting image points defining lines and areas of interest in said three-dimensional image;

the improvement comprising:

means for providing a first coordinate measuring system for one of said stereo images and a second coordinate measuring system for the other of said stereo images;

measuring means for measuring the coordinate positions in said coordinate measuring systems of conjugate points on said two stereo images forming a selected image point;

calculating means for using said measured positions and the relationship between the positions of said reference points in said coordinate measuring system and the predetermined locations in the scene to calculate the positions in an undistorted model of the scene of points, lines and areas represented by measured pairs of conjugate points; and means for moving said one stereo image and first coordinate system with respect to said other stereo image and second coordinate system to vary the stereo quality and provide stereo fusion in the area of the three-dimensional image being viewed.

9. The stereoplotter set forth in claim 8 in which:

said means for providing said first coordinate measuring system comprises a first grid device;

said means for providing said second coordinate measuring system comprises a second grid device; and said stereoplotter also includes:

calculating means for converting said coordinate positions in said coordinate measuring systems to the stereo image coordinates of said conjugate points and for using said stereo image coordinates to calculate the coordinate positions in an undistorted model of the scene of said selected image points.

10. The stereoplotter set forth in claim 9 in which:

said one stereo image is fastened to said first grid device and said other stereo image is fastened to said second grid device to maintain a fixed relationship between each stereo image and the coordinate system provided by the grid device fastened to that stereo image; and said means for holding two stereo images comprises a first image carrier for holding one stereo image and a second image carrier for holding the other stereo image.

11. The stereoplotter set forth in claim 10 in which said one stereo image and first grid device are movably disposed on said first image carrier, and said other stereo image and said second grid device are movably disposed on said second image carrier to permit an operator to move said stereo images with respect to said image carriers.

12. The stereoplotter set forth in claim 8 in which:

said viewing means comprise binocular viewing apparatus for viewing said two stereo images simultaneously, said binocular apparatus defining an eye base for the stereoplotter; and said means for moving comprises means for moving one of said stereo images in a direction parallel to said eye base.

13. The stereoplotter set forth in claim 12 in which:

said two stereo images are held substantially in a plane; and said moving means comprises means for moving one of said stereo images in a direction substantially perpendicular to said eye base and in said plane.

14. In a stereoplotter having:

means for holding two stereo images of a scene; and viewing means for providing a first optic path to one of said stereo images and a second optic path to the other stereo image to thereby provide one viewing the stereo images with a three-dimensional image of said scene, said three-dimensional image comprising a collection of image points, each image point formed from one conjugate point on each of two stereo images;

improved means for providing a floating mark for identifying points of interest in said three-dimensional image comprising:

means disposed in the first optic path defining a first half mark for identifying points on the one image shaped to provide both an $x$ coordinate defining and a $y$ coordinate defining portion of said floating mark; and means disposed in the second optic path defining a second half mark for identifying points of interest on the other of said stereo images shaped to provide only an $x$ coordinate defining portion of said floating mark, said two half marks providing a floating mark capable of identifying points in said three-dimensional image when said stereo images are oriented to provide a three-dimensional image having a moderate amount of Y parallax, and when said half marks are placed over conjugate points on the two stereo images.

15. The stereoplotter set forth in claim 14 further including:

means for measuring the $x$ and $y$ image positions of identified conjugate points on said one stereo image;

means for measuring only the $x$ image positions of identified points on said other stereo image; and calculating means for using said measured image positions to calculate the coordinate position in an undistorted model of said scene of points identified in said three-dimensional image.

16. The stereoplotter set forth in claim 15 in which:

said viewing means comprises binocular viewing apparatus for viewing said two stereo images simultaneously, said binocular apparatus defining an $x$ axis for the stereoplotter parallel to the eye base of said binocular apparatus; and said second half mark comprises a broken straight line substantially perpendicular to said $x$ axis, said break defining a $y$ coordinate position when said second half mark is viewed alone.

17. The stereoplotter set forth in claim 15 in which:

said means for holding said two stereo images is constructed to hold said images substantially in a plane;

said viewing means comprise binocular viewing apparatus for viewing said two stereo images simultaneously, said binocular apparatus defining an eye base for the stereoplotter; and said calculating means comprises means for calculating said coordinate position in said undistorted model using the formulas:

$$X = X_{L_{16}} + Sx'_{16}$$
$$Y = Y_{L_{16}} + Sy'_{16}$$
$$Z = Z_{L_{16}} + Sz'_{16}$$

where:

the $X$ axis of the coordinate system for the above three formulas is parallel to said eye base;

the $Y$ axis of said coordinate system is perpendicular to said $X$ axis and is substantially in said plane;

the $Z$ axis of said coordinate system is perpendicular to the $X$ and $Y$ axes;

$X,Y,Z$ = the coordinates of a point in the scene;

$X_{L_{16}}$, $Y_{L_{16}}$, $Z_{L_{16}}$ = the location in model coordinates of the coordinate origin of the image coordinate system for one stereo image;

$S$ = a scale factor relating image coordinate scale to model coordinate scale; and $x'_{16}$, $Y'_{16}$, $z'_{16}$ = the stereo image coordinates of the one stereo image with its coordinate origin at $X_{L_{16}}$, $Y_{L_{16}}$, $Z_{L_{16}}$ rotated to be parallel to the model coordinate axes.

18. A stereoplotter for providing coordinate positions of selected points in an undistorted model of a scene, and indicating whether said points lie on a preselected contour in said undistorted model comprising:

means for holding two stereo images of the scene;

viewing means for providing a possibly distorted three-dimensional image of said scene, said three-dimensional image comprising a collection of image points, each image point formed from one conjugate point on each of said stereo images;

means for selecting points of interest in said three-dimensional image;

means for automatically measuring the image positions of conjugate point pairs forming said selected image points in said three-dimensional image;

calculating means for responding immediately to said measured image positions and calculating the coordinate position in an undistorted model of said scene of said selected image points; and signal means responsive to said calculated coordinate positions for providing a signal indicating whether the calculated elevation of a selected point differs from the elevation of a preselected contour, said signal providing means thereby enabling an operator to select points along a preselected contour in an undistorted model of the scene from a possibly distorted three-dimensional image of that scene.

19. The stereoplotter set forth in claim 18 in which said signal providing means provides a first signal to indicate the calculated elevation of a selected point is higher than said preselected elevation and a second signal to indicate the calculated elevation of a selected point is lower than said preselected elevation.

20. The stereoplotter set forth in claim 18 in which:

said viewing means comprises a binocular viewing apparatus for viewing said two stereo images simultaneously, said binocular apparatus defining an $x$ axis for said stereoplotter parallel to the eye base of said binocular apparatus;

said selecting means comprises means for providing a floating mark for selecting points of interest in the three-dimensional image; and said signal providing means comprises means for moving one of said stereo images along said $x$ axis of said stereoplotter to introduce $X$ parallax into said three-dimensional image to raise the elevation of said floating mark when said calculated elevation is greater than said preselected elevation, and to lower the elevation of said floating mark when said calculated elevation is lower than said preselected elevation.

21. A method for providing an undistorted model of a scene from a three-dimensional image that may be either distorted or undistorted of the scene comprising the steps of:

providing two stereo images of a scene, said stereo images carrying reference points representing predetermined locations in the scene;

viewing said two stereo images simultaneously to obtain a possibly distorted three-dimensional image of said scene, said three-dimensional image comprising a collection of image points, each image point formed from one conjugate point on each of said stereo images;

selecting points, lines, and areas of interest in said three-dimensional image;

measuring the image positions of conjugate point pairs forming said selected points, lines, and areas of said three-dimensional image;

using said measured image positions and the relationship between the image positions of said reference points and the predetermined locations in the scene to calculate the coordinate positions in an undistorted model of said scene of image points, lines, and areas represented by measured pairs of conjugate points; and forming a representation of the undistorted scene from said calculated coordinate positions.

22. The method set forth in claim 21 in which said steps of measuring and calculating said positions are performed by automatic measuring and calculating apparatus respectively, and in which said step of forming said representation is performed by an automatic graphing apparatus responsive to said calculated coordinate positions.

23. The method set forth in claim 21 further including the step of:

recording said measured image positions; and said step of calculating coordinate positions in an undistorted model is performed for each selected conjugate point pair after a record of the image positions of all selected conjugate point pairs has been provided.

24. The method set forth in claim 21 in which said step of calculating coordinate positions in an undistorted model is performed for each selected conjugate point pair immediately after selection of said point pair to provide a real time representation of the undistorted model.

25. The method set forth in claim 21 further including the steps of:

recording said measured image positions; and inserting control signals into the record of stereo image coordinates that indicate the classification of recorded point pairs.

26. The method set forth in claim 21 in which:

said step of selecting points, lines, and areas of interest includes providing a floating mark to stereoscopically identify and select points, lines and areas of interest in said three-dimensional image; and the method further includes the step of automatically recording the image positions of conjugate point pairs forming an image point identified by the floating mark whenever said floating mark is moved a predetermined distance.

27. The method set forth in claim 21 in which:

said step of selecting points, lines, and areas of interest includes providing a floating mark to stereoscopically identify and select points, lines, and areas of interest in said three-dimensional image, and moving said floating mark along a plurality of parallel lines to select points lying along the said lines; and said calculation includes using the image positions of said selected points lying along said lines to calculate the $X$ and $Y$ model coordinate values of points lying along preselected contours of said model at preselected intervals.

28. The method set forth in claim 21 further including the step of forming a trace of points, lines, and areas selected to be of interest, said trace enabling an operator to determine the points, lines, and areas that have been selected.

29. The method set forth in claim 28 further including the step of superimposing an image of said trace onto said three-dimensional image.

30. A method for providing coordinate positions of selected points in an undistorted model of a scene, said points being selected from a three-dimensional image of the scene that may be distorted and that may be varied during point selection to minimize distortions in one area of said image comprising the steps of:

providing two stereo images of the scene, each stereo image including reference points representing predetermined locations in the scene;

providing a first coordinate measuring system for one stereo image and a second coordinate measuring system for the other of said stereo images;

viewing said two stereo images simultaneously to obtain a three-dimensional image of said scene, said three-dimensional image comprising a collection of image points, each image point formed from one conjugate point on each of said stereo images;

selecting points defining lines and areas of interest in said three-dimensional image;

measuring the positions in said coordinate measuring systems of conjugate point pairs forming said selected image points;

moving one of said stereo images with respect to the other while maintaining a fixed spatial relationship between each stereo image and the coordinate measuring system for said each stereo image, said relative movement thereby enabling an operator to vary the stereo quality of and provide stereo fusion in the area of the three-dimensional image being viewed; and using said measured coordinates and the relationship between the positions of said reference points in said coordinate measuring systems and in an undistorted model of the scene to calculate the positions in an undistorted model of the scene of image points represented by measured pairs of conjugate points.

31. The method set forth in claim 30 in which said step of calculating coordinate positions in an undistorted model includes:

determining the relative positions of said one stereo image in said first measuring coordinate system and the relative positions of said other stereo image in said second measuring coordinate system; and converting said positions measured in said coordinate measuring systems to stereo image coordinate positions; and using said stereo image coordinate positions to calculate positions in an undistorted model of image points represented by measured pairs of conjugate points.

32. The method set forth in claim 31 in which:

said step of providing first and second reference coordinate measuring systems comprises fastening a first reference grid measuring system to one of said stereo images and fastening a second reference grid measuring system to the other of said stereo images; and said step of converting coordinate positions in said coordinate measuring system to stereo image coordinate positions is accomplished using the formulas:

$$x = x_g \cos \theta + y_g \sin \theta + x_o$$
$$y = -x_g \sin \theta + y_g \cos \theta + y_o$$

where:

$x,y$ = stereo image coordinates of a point
$x_g, y_g$ = grid coordinates of the same point
$x_o, y_o$ = stereo image coordinates of the grid coordinate origin
$\theta$ = angle of rotation between the grid and stereo image coordinate systems.

33. The method set forth in claim 32 in which:

said step of measuring positions in said coordinate measuring systems comprises measuring the $x$ and $y$ coordinates of conjugate points on each stereo image; and said calculation of the coordinate positions in an undistorted model of image points represented by pairs of conjugate image points is performed according to the formulas:

$$X = X_{L_{16}} + S x'_{16}$$
$$Y = Y_{L_{16}} + S y'_{16}$$
$$Z = Z_{L_{16}} + S z'_{16}$$

where:

the $X$ axis of the coordinate system for the above three formulas is parallel to the eye base of an observer viewing said three-dimensional image in an ordinary manner;

the $Z$ axis of said coordinate system is perpendicular to said $X$ axis and defines elevation in said three-dimensional image;

the $Y$ axis of said coordinate system is perpendicular to both the $X$ and $Z$ axes;

$X,Y,Z$ = model coordinates of a point in the scene;

$X_{L_{16}}, Y_{L_{16}}, Z_{L_{16}}$ = the location in model coordinates of the coordinate origin of the image coordinate system for one stereo image;

$S$ = a scale factor relating image coordinate scale to model coordinate scale; and $x'_{16}, y'_{16}, z'_{16}$ = the stereo image coordinates of the one stereo image with coordinate origin at $X_{L_{16}}, Y_{L_{16}}, Z_{L_{16}}$ rotated to be parallel to the model coordinate axes.

34. A method for providing coordinate positions of selected points in an undistorted model of a scene, said points being selected from a three-dimensional image that may contain a moderate amount of $Y$ parallax and be otherwise distorted comprising the steps of:

providing two stereo images of the scene;

viewing said two stereo images simultaneously to obtain a possibly distorted three-dimensional image of said scene, said three-dimensional image comprising a collection of image points, each image point formed from one conjugate point on each of said stereo images;

providing a floating mark for selecting and identifying points of interest in said three-dimensional image by providing a first half mark for identifying points on one of said stereo images shaped to provide both $x$ coordinate defining and $y$ coordinate defining portions of said floating mark, and a second half mark for identifying points of interest on the other of said stereo images shaped to provide only an $x$ coordinate defining portion of said floating mark, said two half marks providing a floating mark capable of identifying points in said three-dimensional image when said stereo images are oriented to provide a three-dimensional image having a moderate amount of $Y$ parallax and when said half marks are placed over conjugate points on the two stereo images;

selecting points of interest in said three-dimensional image with said floating mark;

determining the image positions of conjugate points forming said selected image points; and using said image positions to calculate the coordinate positions in an undistorted model of said scene of said selected image points.

35. The method set forth in claim 34 in which said second half mark comprises a straight line disposed substantially perpendicular to the eye base of an observer viewing said three-dimensional image in an ordinary manner.

36. The method set forth in claim 35 in which said step of providing said second half mark provides a broken straight line with said break defining a $y$ coordinate position when said second half mark is viewed alone.

37. The method set forth in claim 34 in which:

said step of determining the stereo image coordinates of said conjugate points comprises determining the $x$ and $y$ stereo image coordinates of conjugate points on said one stereo image, and determining the $x$ stereo image coordinates of conjugate points on said other stereo image; and said calculating coordinate positions in an undistorted model is performed using the formulas:

$$X = X_{L_{16}} + S' x'_{16}$$
$$Y = Y_{L_{16}} + S' y'_{16}$$
$$Z = Z_{L_{16}} + S' z'_{16}$$

where:

the $x$ axis of the coordinate system for the above three formulas is parallel to the eye base of an observer viewing said three-dimensional image in an ordinary manner;

the $Z$ axis of said coordinate system is perpendicular to said $X$ axis and defines elevations in the three-dimensional image;

the $Y$ axis of said coordinate system is perpendicular to the $X$ and $Z$ axes;

$X,Y,Z,$ = model coordinates of a point in the scene;

$X_{L_{16}}, Y_{L_{16}}, Z_{L_{16}}$ = the location in model coordinates of the coordinate origin of the image coordinate system for one stereo image;

$S'$ = a scale factor relating image coordinate scale to model coordinate scale and the attitude of one stereo image to that of the other;

$x'_{16}, y'_{16}, z'_{16}$ = the stereo image coordinates of the one stereo image with coordinate origin at $X_{L_{16}}, Y_{L_{16}}$, rotated to be parallel to the model coordinate axes.

38. A method of determining the coordinate positions in an undistorted model of points selected from a possibly distorted three-dimensional image of a scene, and for indicating whether said points lie on a preselected contour in said undistorted model comprising the steps of:

providing two stereo images of the scene;

viewing said two stereo images simultaneously to obtain a possibly distorted three-dimensional image of said scene, said three-dimensional image comprising a collection of image points, each image point formed from one conjugate point on each of said stereo images;

selecting points of interest in said three-dimensional image;

determining the stereo image coordinates of conjugate point pairs forming said selected image points in said three-dimensional image;

using said stereo image coordinates to calculate the coordinate position in an undistorted model of said scene of an image point immediately after selection of said an image point; and providing a signal indicating the relationship between the elevation of the calculated coordinate position of said an image point and the elevation of a preselected contour.

39. The method set forth in claim 38 in which said step of providing a signal indicating the relationship between said calculated elevation and said preselected elevation comprises providing a first signal for indicating said calculated elevation to be greater than said preselected elevation, and providing a second signal for indicating said calculated elevation to be less than said preselected elevation.

40. The method set forth in claim 38 in which:

said points of interest in said three-dimensional image are selected with a floating mark formed from a first half mark for identifying points on one of said stereo images and a second half mark for identifying points on the other of said stereo images; and said providing a signal indicating the relationship between the calculated and preselected elevations comprises providing a relative movement between said one stereo image and said one half mark to vary the apparent elevation of said floating mark, said relative movement comprising movement causing the apparent elevation of said floating mark to increase when said calculated elevation is greater than said preselected elevation, and to cause the apparent elevation of said floating mark to decrease when said calculated elevation is lower than said preselected elevation.

* * * * *